US008930668B2

(12) United States Patent
Engle et al.

(10) Patent No.: US 8,930,668 B2
(45) Date of Patent: Jan. 6, 2015

(54) STORAGE BLACK BOX

(71) Applicant: Bank of America Corporation, Charlotte, NC (US)

(72) Inventors: Ronald Engle, Minooka, IL (US); Prentice O. Dees, Jr., Atlanta, GA (US)

(73) Assignee: Bank of America Corporation, Charlotte, NC (US)

( * ) Notice: Subject to any disclaimer, the term of this patent is extended or adjusted under 35 U.S.C. 154(b) by 215 days.

(21) Appl. No.: 13/678,419

(22) Filed: Nov. 15, 2012

(65) Prior Publication Data

US 2014/0136809 A1    May 15, 2014

(51) Int. Cl.
*G06F 12/02* (2006.01)
*G06F 3/06* (2006.01)

(52) U.S. Cl.
CPC .............. *G06F 3/0631* (2013.01); *G06F 12/02* (2013.01)
USPC .......................................................... 711/170

(58) Field of Classification Search
CPC ... G06F 12/02; G06F 12/0223; G06F 3/0631; G06F 3/0635; G06F 3/0662; G06F 3/0665; G06F 3/067
See application file for complete search history.

(56) References Cited

U.S. PATENT DOCUMENTS

| | | | |
|---|---|---|---|
| 8,103,776 B2 * | 1/2012 | DeHaan | 709/226 |
| 8,171,201 B1 | 5/2012 | Edwards, Sr. | |
| 2008/0155208 A1 * | 6/2008 | Hiltgen et al. | 711/154 |
| 2010/0057913 A1 | 3/2010 | DeHaan | |
| 2012/0102291 A1 | 4/2012 | Cherian et al. | |
| 2012/0272237 A1 | 10/2012 | Baron | |
| 2014/0156925 A1 * | 6/2014 | Baron et al. | 711/114 |

OTHER PUBLICATIONS

United Kingdom Search Report dated Apr. 14, 2014 for Application No. GB1319927.8.

* cited by examiner

*Primary Examiner* — Hiep Nguyen
(74) *Attorney, Agent, or Firm* — Michael A. Springs; Moore and Van Allen, PLLC; Patrick B. Horne

(57) ABSTRACT

Embodiments of the invention are directed to a system, method, or computer program product for providing a storage allocation to a virtual machine in response to a service request including receiving a service request including a virtual machine and storage parameters and running a policy engine to determine appropriate storage allocation to achieve storage parameters received from the requester, which may include applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space. Component space is provisioned and a communication channel is established between the operating system to the component space based on the policy engine.

21 Claims, 13 Drawing Sheets

STORAGE BLACK BOX

BACKGROUND

Traditional information technology infrastructures for entities usually require several operating environments, vendor resource deployment, authentication repositories and mechanisms, and several application servers working together in order to operate a large entity's information technology.

Furthermore installing and/or implementing core functions, such as new software or hardware within an entity's information technology infrastructure requires several time consuming steps. For example, ordering and installing a new physical server and/or associate work station requires a logical process to load the necessary operating systems, secure the server, install applications, ensure licensing from proper vendors, and the like. In some cases this process can take several weeks or months for the server(s) to become operational and business-ready for the entity.

Furthermore, the new physical server and/or associate work station may have hardware or software features that provide functionality to the physical server and/or associate work station that are not being utilized. For example, the associate work station may have a large amount of memory that the associate may have requested, but may not be utilized. Thus, the entity may be paying for information technology infrastructure that is not being utilized to its fullest capacity.

Therefore, a need exists for a logical management system of information technologies within an entity that drastically limits the time required for core functions to be completed and intelligently monitors the core functions once implemented.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the invention address the above needs and/or achieve other advantages by providing apparatus (e.g., a system, computer program product, and/or other devices) and methods for providing an information technology build service for building a platform in response to a service request.

According to some embodiments of the invention, a system has a memory device with computer-readable program code stored thereon, a communication device, and a processing device operatively coupled to the memory device and the communication device. The processing device is configured to execute the computer-readable program code to receive a service request for a platform build from a requester, the platform build comprising a virtual machine; receive a plurality of storage parameters from the requester; run a policy engine to determine appropriate storage allocation to achieve storage parameters received from the requester; and provision component space and establishing a communication channel from an operating system of the virtual machine to the provisioned component space.

In some embodiments, the processing device is further configured to execute the computer-readable program code to present a single storage space to the operating system of the virtual machine for usage. In some embodiments, running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

In some embodiments, running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

In some embodiments, the processing device is further configured to execute the computer-readable program code to communicate with one or more vendor application programming interfaces to interface with a plurality of vendor storage components according to a preprogrammed set of configuration standards associated with a vendor and the vendor storage components. In some embodiments, the processing device is further configured to execute the computer-readable program code to run a web services client for providing an application programming interface for receiving service requests and storage parameters from requesters. In some embodiments, the processing device is further configured to execute the computer-readable program code to provide a product catalog for presenting a list of available storage solutions to a potential requester, regularly monitor functionality of communication across one or more communication channels established by the system between an operating system and storage components to check for errors, and, in response to a request, present a report comprising information related to the functionality of the communication channels.

According to embodiments of the invention, a computer program product provides a storage allocation to a virtual machine in response to a service request. The computer program product has at least one non-transitory computer-readable medium having computer-readable program code portions embodied therein. The computer-readable program code portions include an executable portion configured for receiving a service request for a platform build from a requester, the platform build comprising a virtual machine, an executable portion configured for receiving a plurality of storage parameters from the requester, an executable portion configured for running a policy engine to determine appropriate storage allocation to achieve storage parameters received from the requester; and an executable portion configured for provisioning component space and establishing a communication channel from an operating system of the virtual machine to the provisioned component space.

In some embodiments, the computer-readable program code portions include an executable portion configured for presenting a single storage space to the operating system of the virtual machine for usage. In some embodiments, running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

In some embodiments, running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

In some embodiments, the computer-readable program code portions include an executable portion configured for communicating with one or more vendor application programming interfaces to interface with a plurality of vendor storage components according to a preprogrammed set of configuration standards associated with a vendor and the vendor storage components. In some embodiments, the computer-readable program code portions include an executable portion configured for running a web services client for providing an application programming interface for receiving service requests and storage parameters from requesters. In some embodiments, the computer-readable program code portions include an executable portion configured for providing a product catalog for presenting a list of available storage solutions to a potential requester, regularly monitoring functionality of communication across one or more communication channels established by the system between an operating system and storage components to check for errors, and, in response to a request, presenting a report comprising information related to the functionality of the communication channels.

According to embodiments of the invention, a computer-implemented method provides a storage allocation to a virtual machine in response to a service request. The method is embodied in at least one non-transitory computer-readable medium having computer-readable program code embodied therein. The computer-readable program code is to cause a computer processor to receive a service request for a platform build from a requester, the platform build comprising a virtual machine, receive a plurality of storage parameters from the requester, run a policy engine to determine appropriate storage allocation to achieve storage parameters received from the requester, and provision component space and establishing a communication channel from an operating system of the virtual machine to the provisioned component space.

In some embodiments, the computer-readable program code is further to cause a computer processor to present a single storage space to the operating system of the virtual machine for usage. In some embodiments, running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

In some embodiments, running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

In some embodiments, the computer-readable program code is further to cause a computer processor to communicate with one or more vendor application programming interfaces to interface with a plurality of vendor storage components according to a preprogrammed set of configuration standards associated with a vendor and the vendor storage components. In some embodiments, the computer-readable program code is further to cause a computer processor to run a web services client for providing an application programming interface for receiving service requests and storage parameters from requesters. In some embodiments, the computer-readable program code is further to cause a computer processor to provide a product catalog for presenting a list of available storage solutions to a potential requester, regularly monitor functionality of communication across one or more communication channels established by the system between an operating system and storage components to check for errors, and, in response to a request, present a report comprising information related to the functionality of the communication channels.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
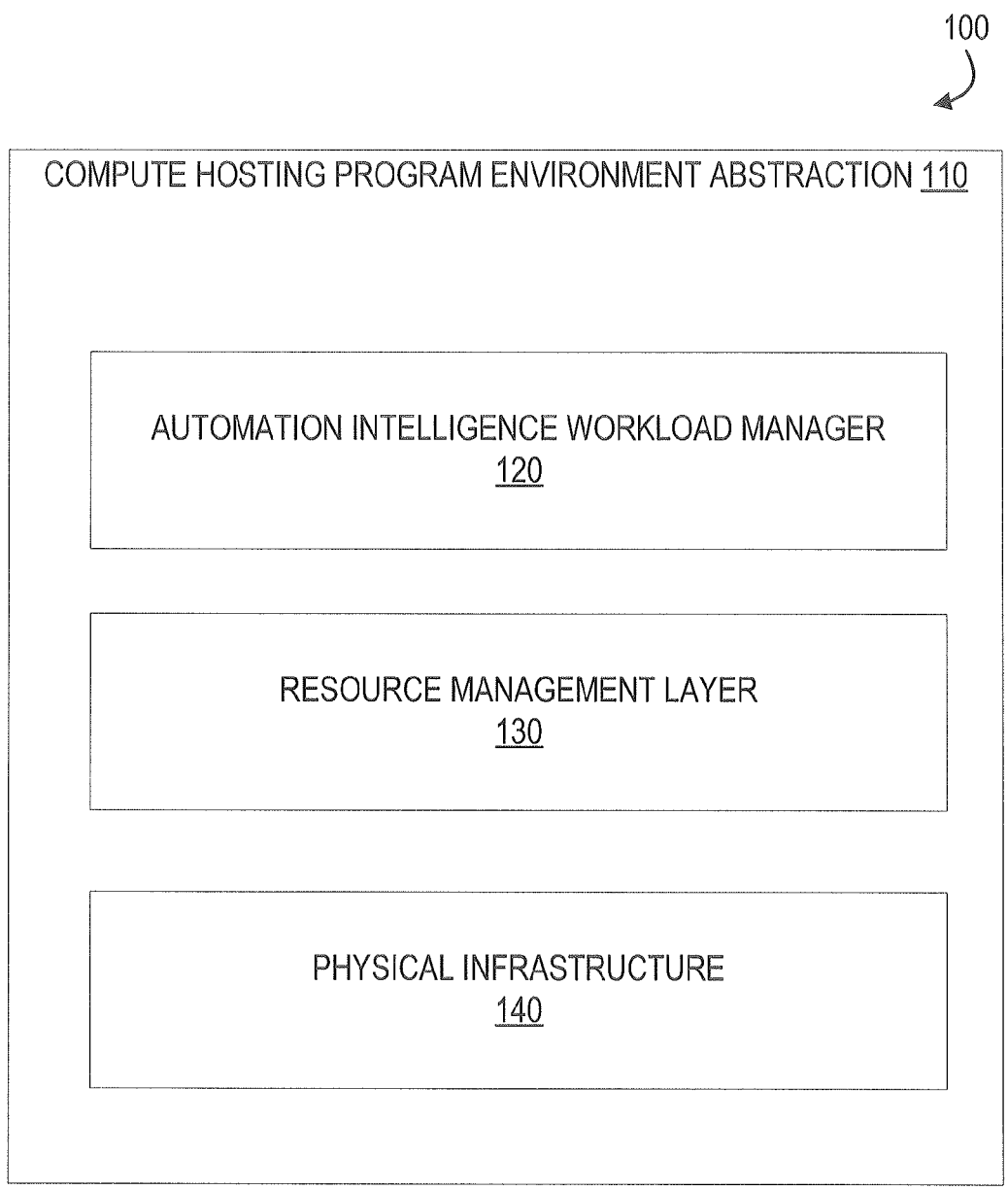
Figure 2:
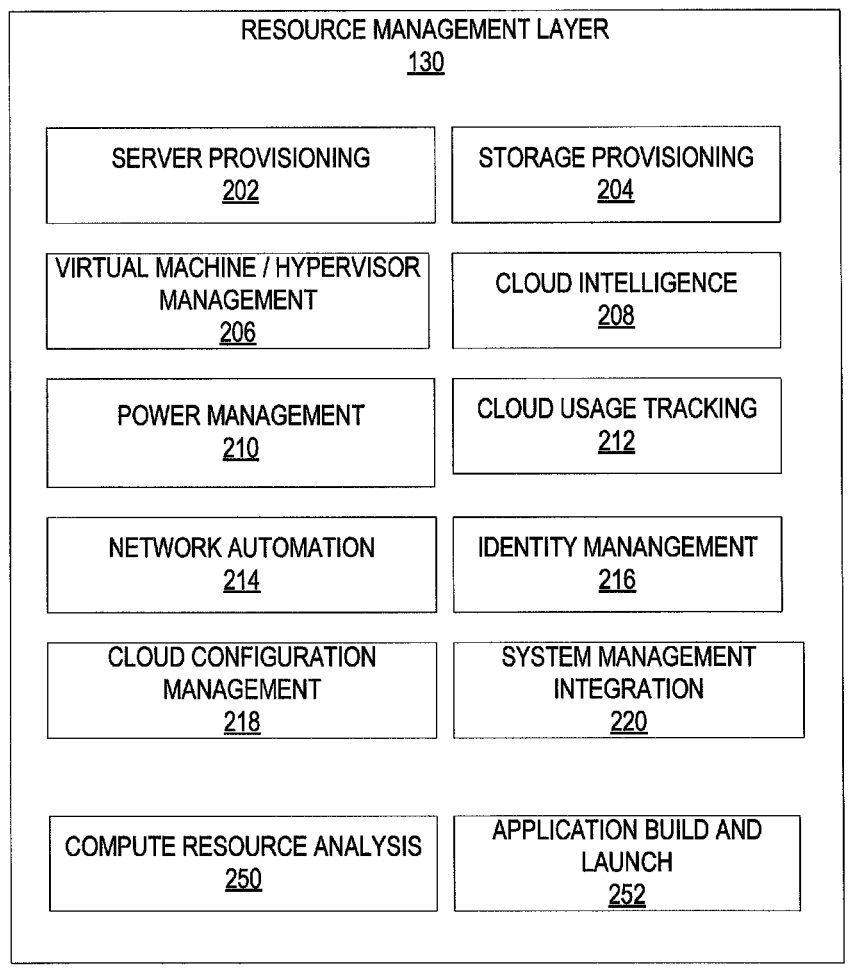
Figure 3:
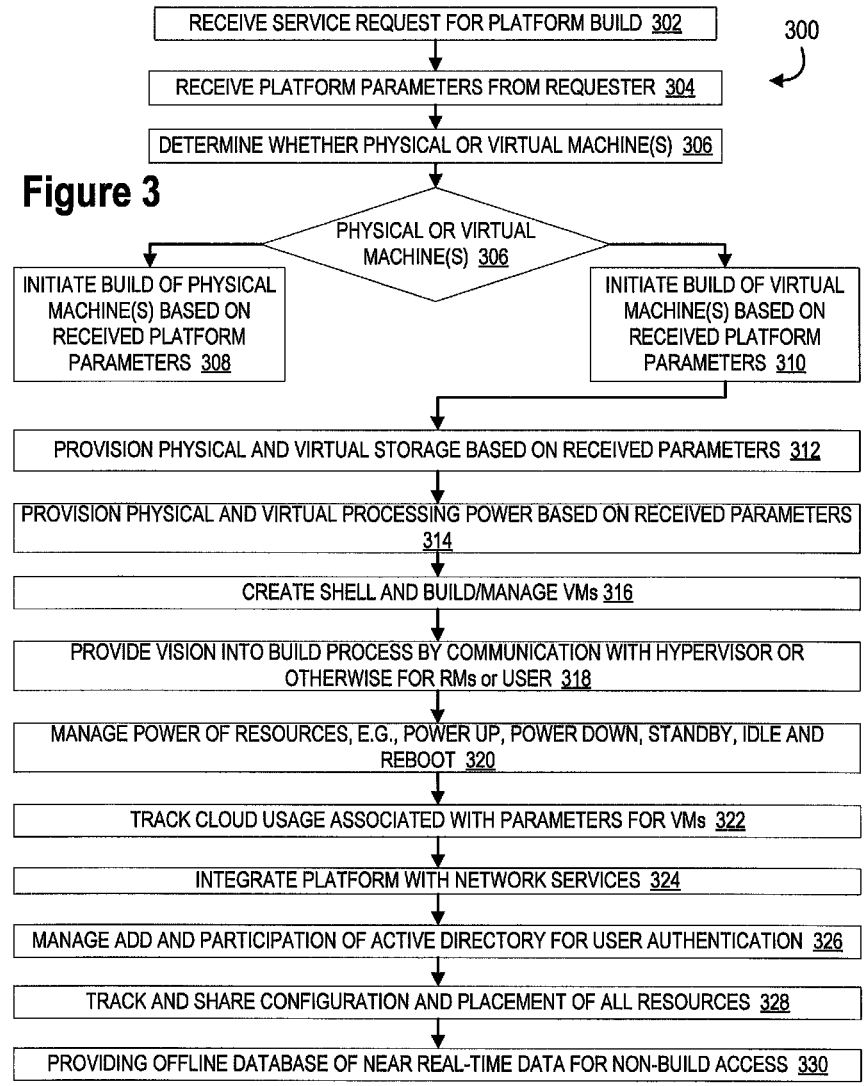
Figure 4:
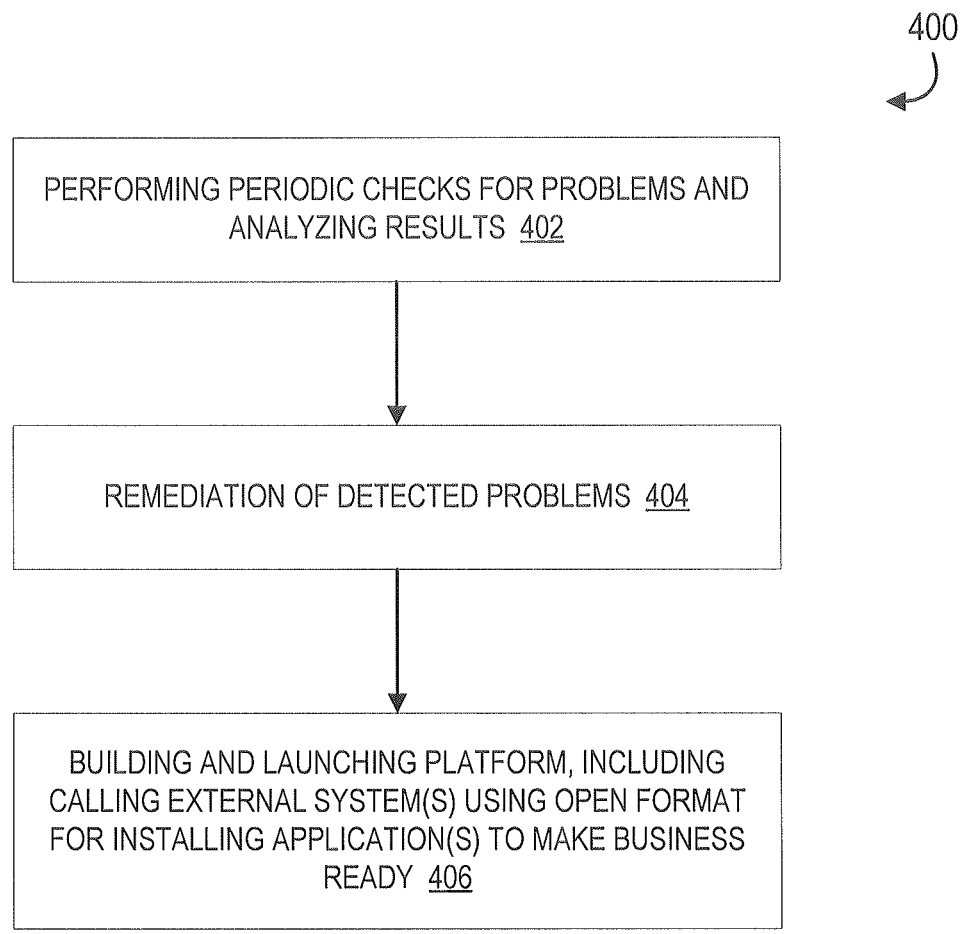
Figure 5:
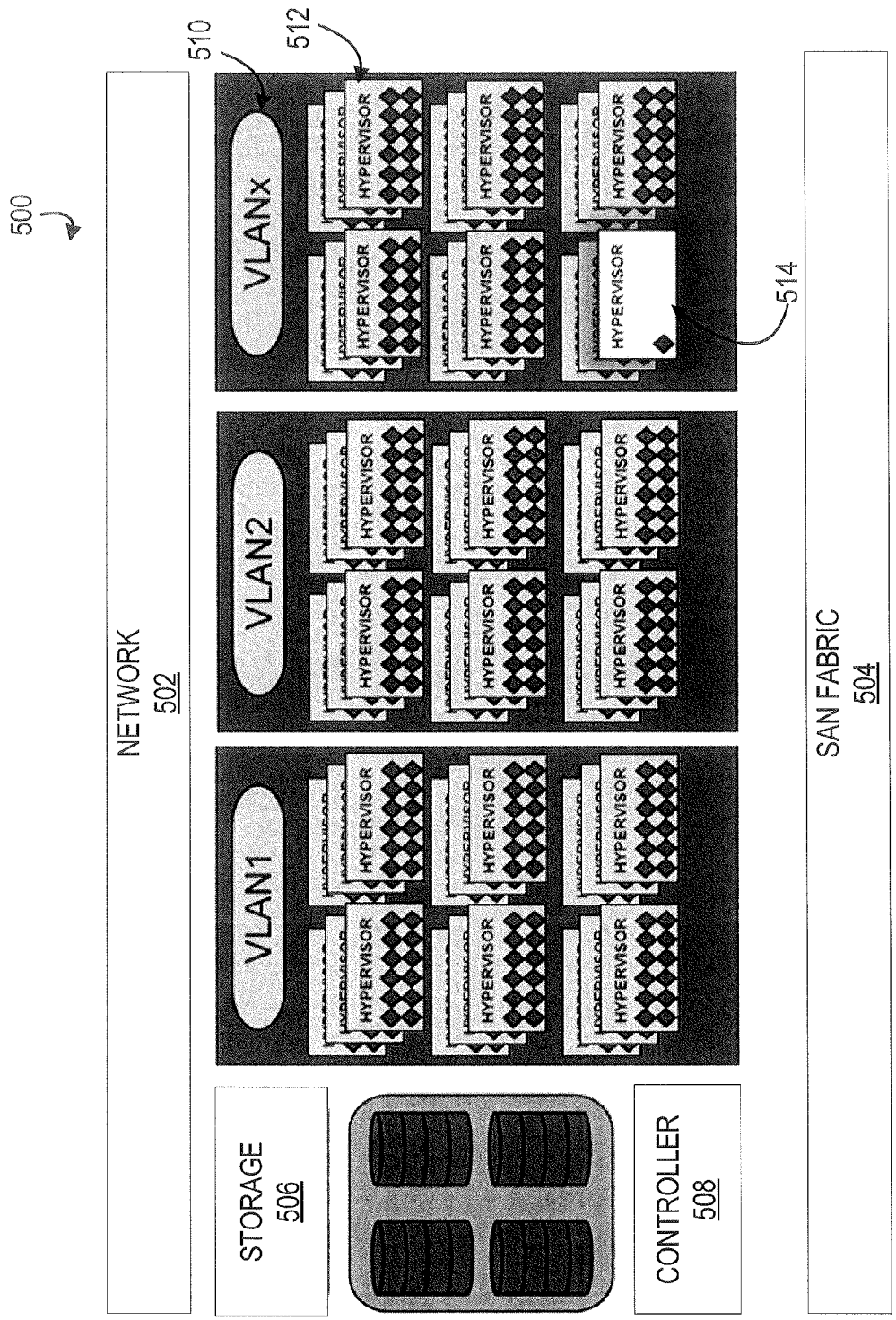
Figure 6:
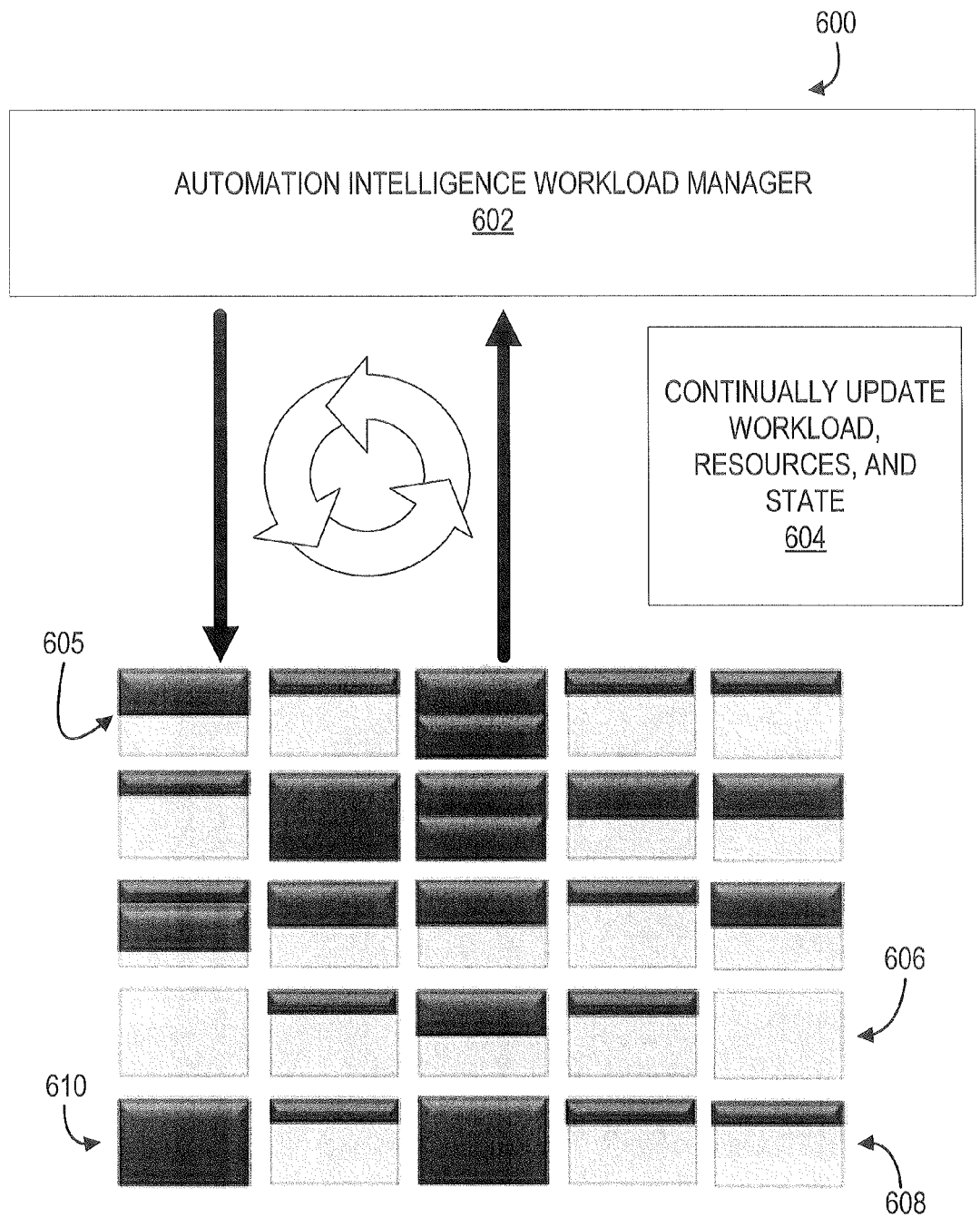
Figure 7:
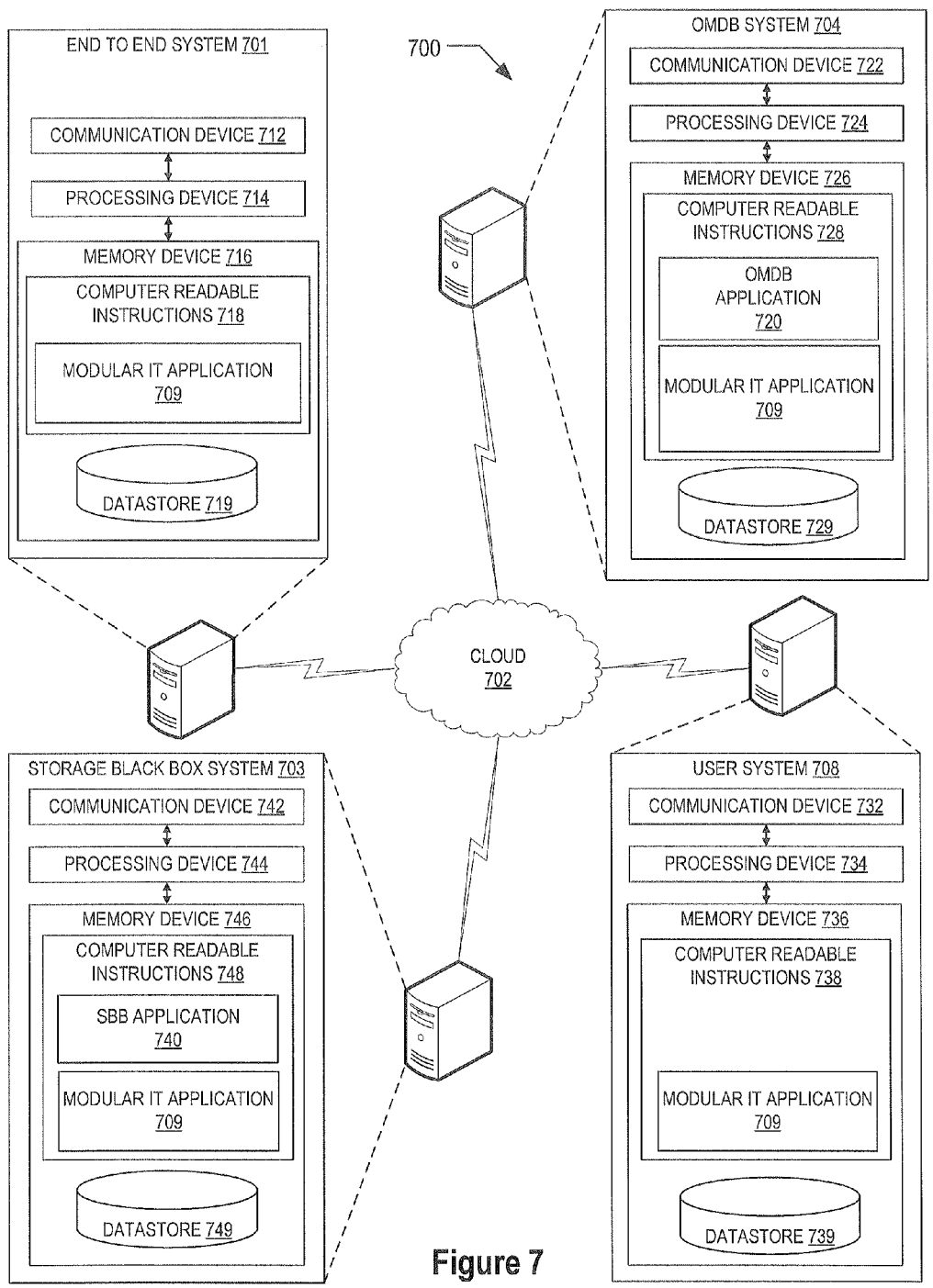
Figure 8:
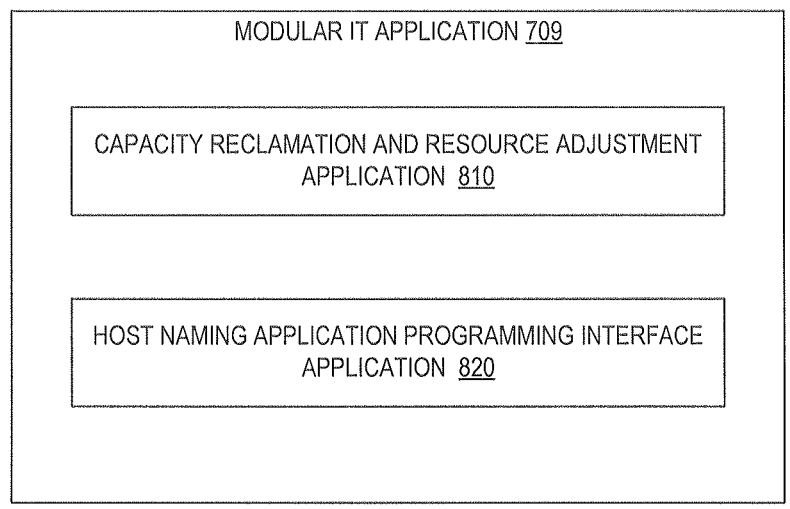
Figure 9:
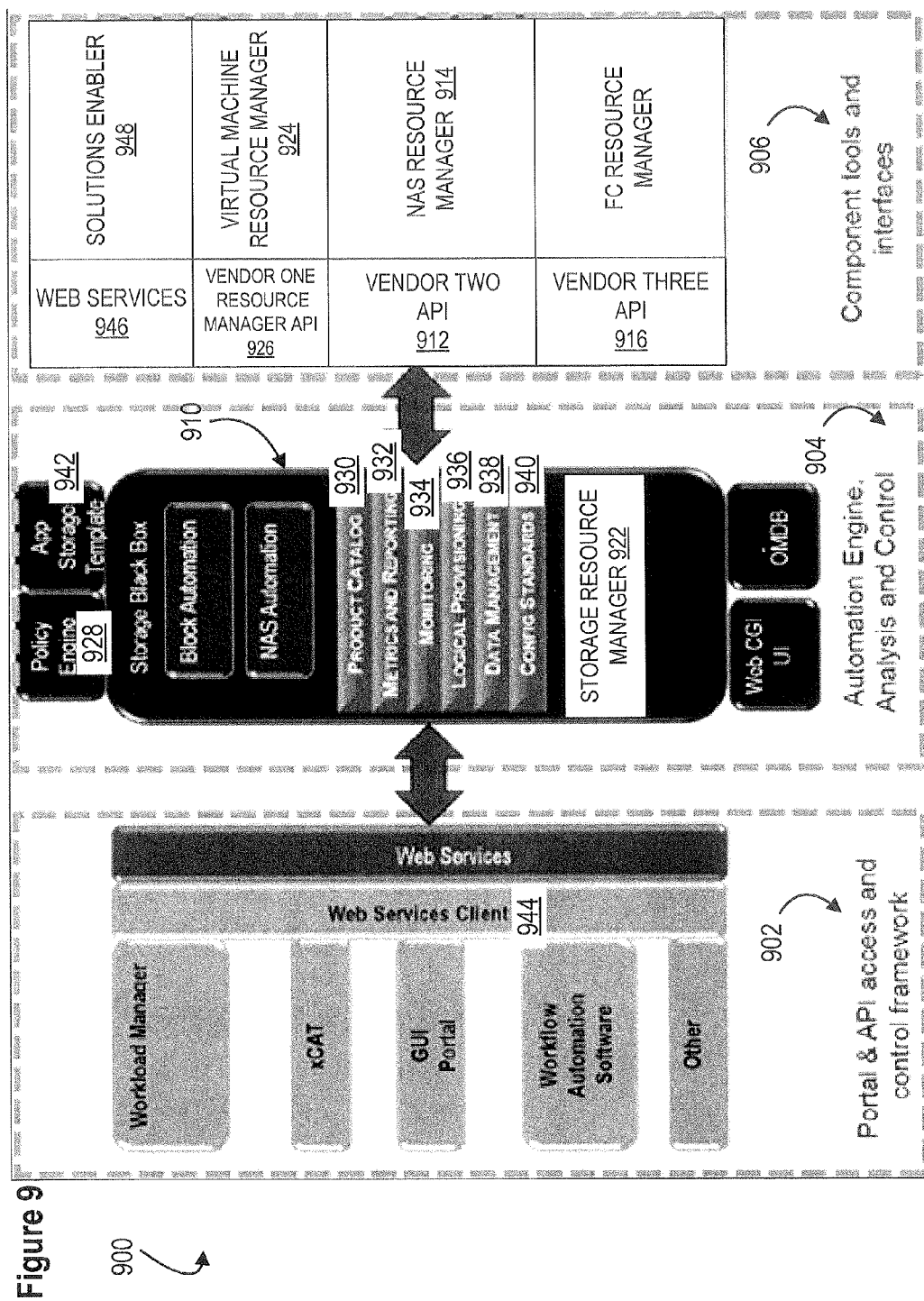
Figure 10:
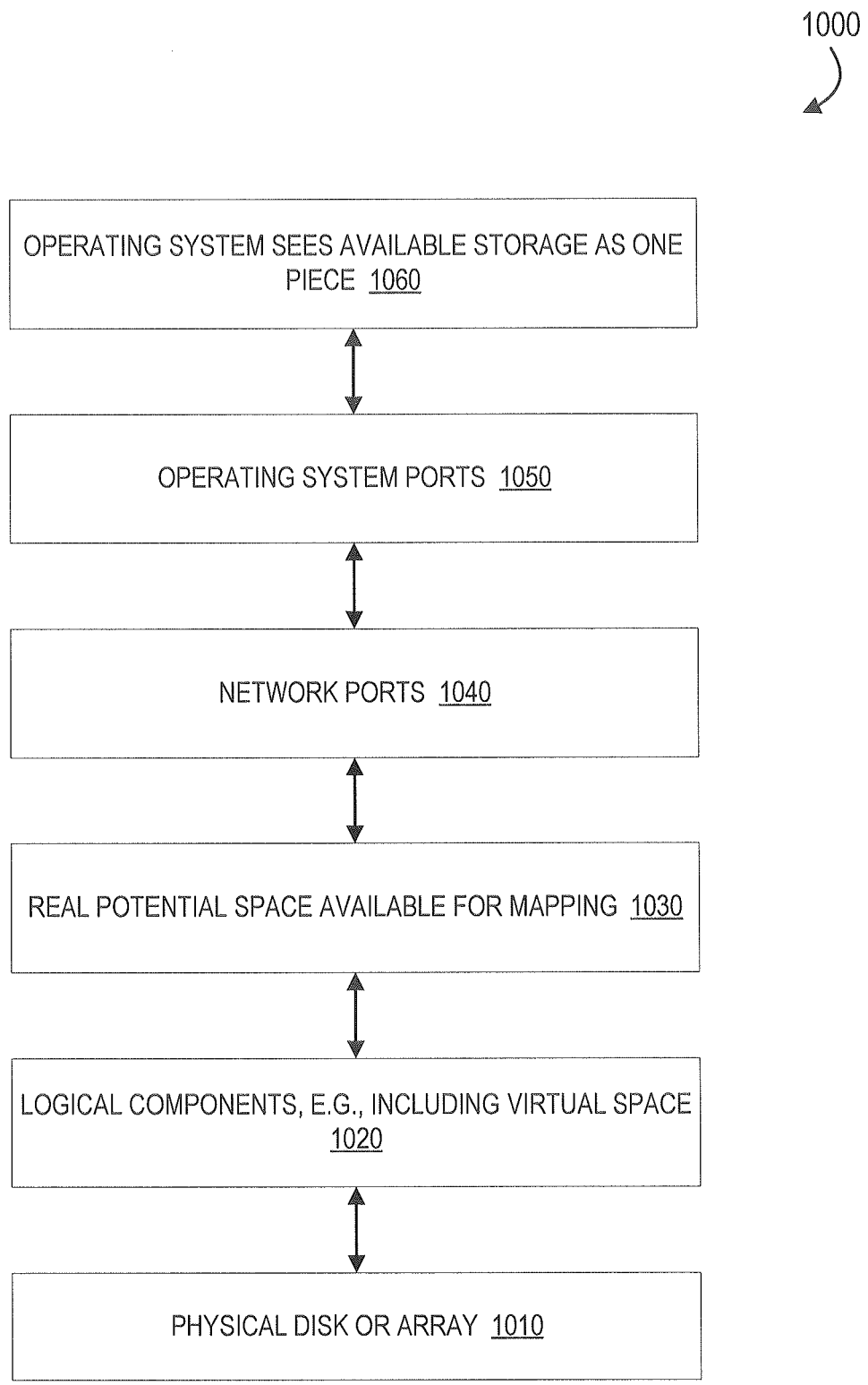
Figure 11:
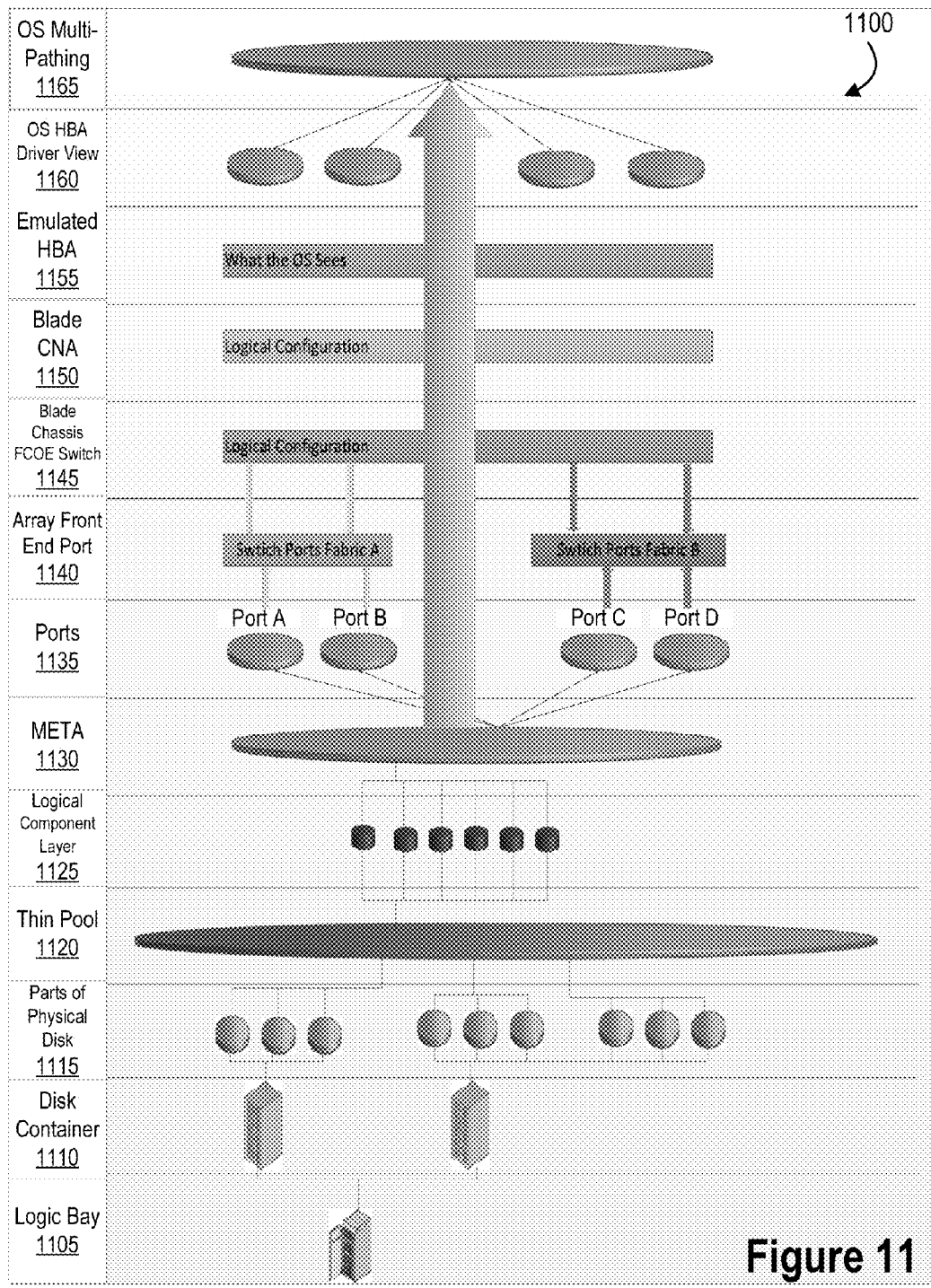
Figure 12:
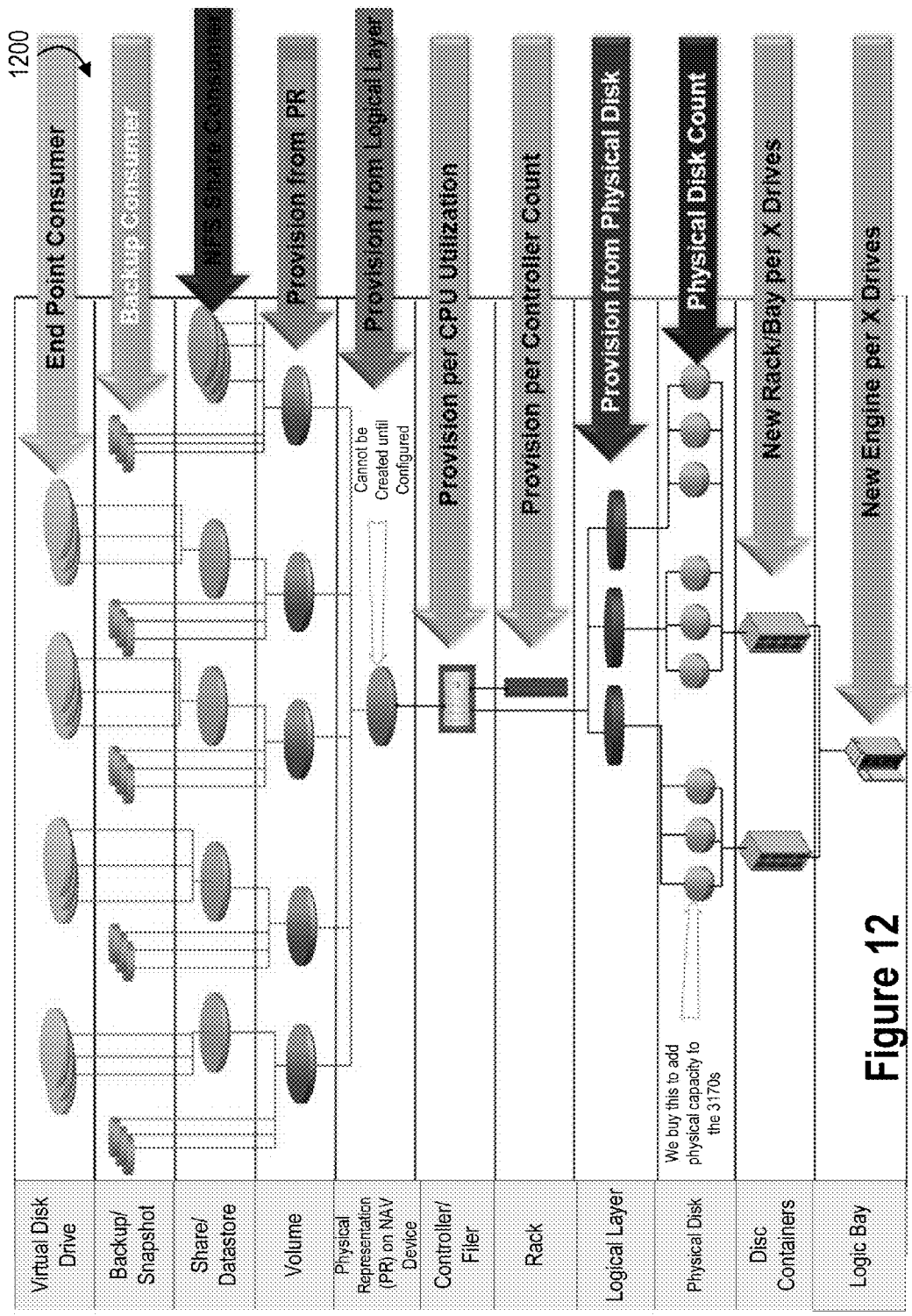
Figure 13:
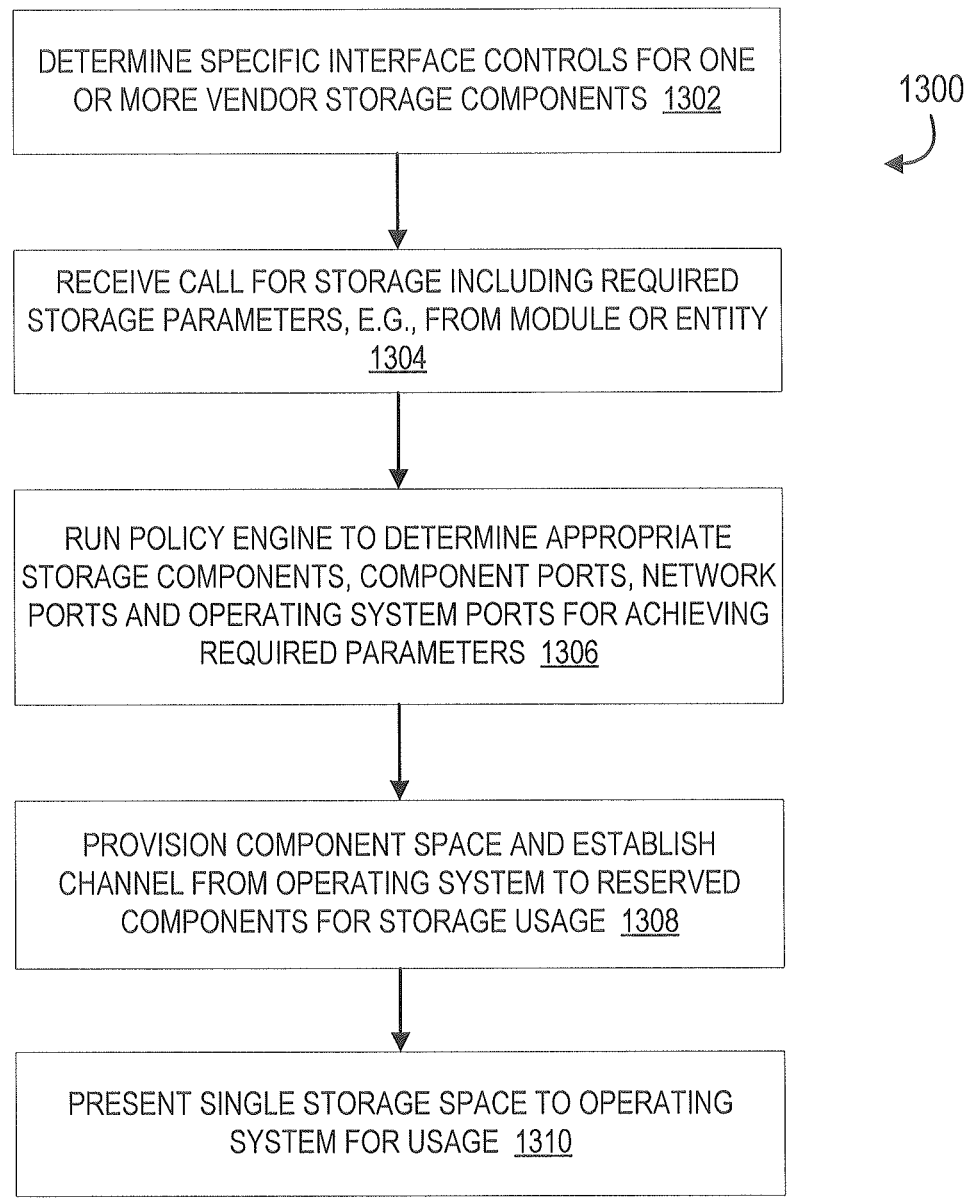

Having thus described embodiments of the invention in general terms, reference will now be made the accompanying drawings, wherein:

FIG. 1 illustrates an ETE system 100 by way of a compute hosting program environment abstraction 110 according to embodiments of the invention;

FIG. 2 illustrates the resource management layer 130 originally presented in FIG. 1 in greater detail and according to embodiments of the invention;

FIG. 3 illustrates a flowchart of a method 300 for building a platform according to embodiments of the invention;

FIG. 4 illustrates a flowchart of a method 400 for potential post-build processing;

FIG. 5 illustrates an information technology infrastructure 500 according to embodiments of the invention;

FIG. 6 illustrates intelligent management of the provisioning of resources within the information technology infrastructure 600, in accordance with embodiments of the invention;

FIG. 7 is a block diagram that illustrates a cloud computing system environment 700 wherein various systems of the invention and various methods of the invention operate according to embodiments of the invention;

FIG. 8 is a block diagram that illustrates the modular IT application 709 originally presented in FIG. 7 in greater detail according to embodiments of the invention;

FIG. 9 is an illustration of a storage automation framework 900 including the storage black box 910 according to embodiments of the invention;

FIG. 10 is a combined flowchart and block diagram that illustrates a representation of an example storage allocation 1000 according to embodiments of the invention;

FIG. 11 is a diagram illustrates a representation of a detailed example storage allocation 1100 using block layers of storage according to embodiments of the invention;

FIG. 12 is a diagram illustrates a representation of another detailed example storage allocation 1200 using NAS layers of capacity according to embodiments of the invention; and FIG. 13 is a flowchart that illustrates a method 1300 for provisioning storage in response to a storage call according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "information technology data" as used herein includes any data that may be needed for an entity to provide information technology infrastructure. For example, this data may include software, hardware, memory, storage, programs, operating systems, programming notes, instructions, output resulting from the use of any software program, including word processing documents, spreadsheets, database files, charts, graphs and outlines, electronic mail or "e-mail," personal digital assistant ("PDA") messages, instant messenger messages, source code of all types, programming languages, linkers and compilers, peripheral drives, PDF files, PRF files, batch files, ASCII files, crosswalks, code keys, pull down tables, logs, file layouts and any and all miscellaneous files or file fragments, deleted file or file fragment. Information technology data may also include any and all items stored on computer memory or memories, hard disks, floppy disks, zip drives, CD-ROM discs, Bernoulli Boxes and their equivalents, magnetic tapes of all types and kinds, microfiche, punched cards, punched tape, computer chips (including but not limited to EPROM, PROM, ROM and RAM of any kind) on or in any other vehicle for digital data storage or transmittal, files, folder tabs, or containers and labels appended to or associated with any physical storage device associated with each original and each copy. In accordance with embodiments of the invention, the term "information technology infrastructure" as used herein refers to the totality of interconnecting hardware and software that supports the flow and processing of information. Information technology infrastructures include all information technology data, physical components, and the like that make up the computing, internet communications, networking, transmission media, etc. of an entity.

Furthermore, embodiments of the present invention use the term "user." A user may be an individual, financial institution, corporation, or other entity that may require electronic data, software, and/or hardware though an information technology infrastructure. Embodiments of the present invention also use the term "vendor" to describe a company, business, individual, or other entity that provides systems, software, hardware, and other technology required for operation of an entity.

Although some embodiments of the invention herein are generally described as involving a "financial institution," other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of entities that have an information technology infrastructure.

According to embodiments of the invention, an end to end modular information technology system (ETE system) provides responses to requests for service. A user or entity may submit a request for a build of a platform of one or more functional information technology (IT) servers. The request for the build may involve a unique configuration for the platform. A "platform" refers to a set of one or more servers to be built, being built or previously built to a specific configuration. The platform for a requested build may be chosen from a collection of predefined common configurations or may be customized by the requester. The platform for a build may also be chosen from a collection of predefined templates and customizable features may then be added as desired. Some components of the platform may include the number of virtual central processing units (CPUs), the amount of memory and the amount of storage to be included in one or more of the IT servers. The ETE system, in order to determine and configure the proper amount of storage for the platform, for example, calls the storage black box system (SBB), which accepts detailed input from the requester and/or the ETE system in order to configure the necessary number of unique storage components and their respective parameters. Once the requester has specified the parameters of the needed platform, the ETE system builds one or more useable servers as requested. The ETE system is discussed in concurrently filed U.S. patent application Ser. No. 13/678,415, entitled "End to End Modular Information Technology System", which is assigned to the assignee of this application.

The one or more servers of the platform may be virtual or physical servers. A virtual or logical server may be built using a hypervisor that functions similarly to an operating system and allows multiple servers to run on one machine as though they were each individually running on a unique physical machine. In this scenario the end user cannot tell whether the server(s) being used are virtual or physical. In applications requiring less processing power or memory, such virtual servers may be stacked on one physical box, or in a situation where high performance is needed, a very large, very high performance physical machine may be built to the specifications of the requester. In this regard, the ETE system is considered to include a modular process for building servers. Among other benefits, the ETE system, in conjunction with the Orchestration Management Database, the Host Naming Application Programming Interface, the Storage Black Box and the Capacity Reclamation and Resource Adjustment Systems, provides streamlined building of servers based on a configuration associated with a particular requested platform. For example, in various instances the time from build request to completed build may be approximately 30 minutes to three hours whereas the process prior to implementation of the ETE system and its tools may take 60 to 90 hours to complete.

Referring now to FIG. 1, an ETE system 100, which may be operating using cloud computing, is illustrated by way of a compute hosting program environment abstraction 110. The abstraction 110 has three layers including an automation intelligence workload manager 120, a resource manager 130 and a physical infrastructure 140. The workload manager 120 is configured to balance the workload of the various components of the resource management layer 130 and/or the components of the physical infrastructure 140. The resource management layer 130 represents an isolation and compartmentalization of specific functions needed to manage the physical device or devices of the physical infrastructure 140 so that efficiency of use of the physical device(s) is maximized. Each of the specific functions of the resource management layer 130 are represented by one of the boxes illustrated in FIG. 2 and is considered a stand-alone component despite the possibility that each of the specific functions, in various embodiments, may be performed by a standalone physical computing device or multiple physical computing devices in collaboration. In various embodiments, one or more physical computing devices may function as a single component or system of the ETE system 100, such as the OMDB, and in some embodiments a single component or system of the ETE system 100 may perform one or several of the specific functions discussed with reference to FIG. 2 and/or other functions.

Referring now to FIG. 2, the resource management layer 130 originally presented in FIG. 1 is shown in greater detail. The resource management layer 130 includes several boxes representing specific, modular functions categorized as various resource managers (RMs) of the ETE system 100. The first box represents a server provisioning RM 202. The server provisioning RM 202 functions similarly to a person directing traffic. When a request for service is received by the ETE system 100, RM 202 recognizes the request and then instructs the various systems and components of the ETE system 100 regarding timing of processes. The RM 202 is, in some embodiments, an open source package that sequentially manages the service request. The RM 202 receives the input parameters for the build from the requester and is used to automate the "build" servers and operating system configuration based on those input parameters.

The next box represents a storage provisioning RM 204. In some embodiments, the storage provisioning RM 204 is or includes the Storage Black Box (SBB) system, which is discussed in greater detail with reference to FIG. 9, et seq. Storage provisioning RM 204 provides for the automated creation, expansion, contraction and deletion of storage allocations for hosts. The storage allocations may be or include network file system (NFS) storage (or network-attached storage or Internet Protocol storage), fiber channel storage (or Storage Area Network (SAN)), or virtual storage. The storage provisioning RM 204 is initiated by the server provisioning RM 202, which calls RM 204 and passes necessary parameters from a requester's service request to RM 202. According to some embodiments of the RM 204, a system, method, or computer program product provides a storage allocation to a virtual machine in response to a service request including receiving a service request including a virtual machine and storage parameters and running a policy engine to determine appropriate storage allocation to achieve storage parameters received from the requester, which may include applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space. Component space is provisioned and a communication channel is established between the operating system to the component space based on the policy engine.

The next box represents a virtual machine/hypervisor management RM 206. RM 206 describes the aggregate functionality for building virtual machines (VMs). Thus, if the build requires one or more virtual machines to be built rather than a more traditional physical server or "bare metal machine", then RM 206 communicates through one or more hypervisors for interacting with the virtual machine. RM 206 manages multiple sequential steps that must be taken to prepare for creating the virtual machine and to build and manage the virtual machine.

The next box represents a cloud intelligence RM 208. RM 208 provides vision into the building process by communication with the hypervisor and/or other components. In some embodiments, the ETE system 100 creates a temporary virtual construct called a shell to facilitate the build of a virtual machine. RM 208 communicates with and gains intelligence from the shell for use by other resource managers or for presentation to a user.

The next box represents a power management RM 210. RM 210 controls the power of resources being used during the building process. For example, RM 210 may control power up, power down, standby, idle and reboot of physical machines being used during the building process. For example, an automated build may require multiple reboots.

The next box represents a cloud usage tracking RM 212. RM 212 provides vision into numerous parameters for each virtual machine being used in the build process. In some embodiments, RM 212 uses an orchestration management database (OMDB), which is discussed in concurrently filed patent application Ser. No. 13/678,029, entitled "Orchestration Management of Information Technology", which is assigned to the assignee of this application and is incorporated by reference in its entirety herein. In short, the OMDB is a single, authoritative source for accurate data or metadata storage and retrieval. In some scenarios, the OMDB maintains data regarding over one hundred parameters associated with a single virtual machine, and RM 212 provides usage tracking information regarding the virtual machine based on the metadata provided by the OMDB. Examples of parameters tracked by RM 212 using the OMDB include when the VM was created, how long has it been running, how much physical storage, how much virtual storage, identity of requester, when was the last time the VM performed a specific function and the like. Any of these parameters may be provided to the user of the ETE system using RM 212 to retrieve metadata stored in the OMDB.

The next box represents a network automation RM 214. RM 214 provides an interface whereby the ETE system can register, add, change, delete or otherwise manipulate domain name system (DNS) and Internet Protocol (IP) data. RM 214 presents a host name for an IP address match and promulgation to the network. In order for the machine being built to be recognizable to the network, it must be matched with an IP address and that IP address must be promulgated through the network so that it is known.

The next box represents an identity management RM 216. RM 216 provides access management functionality. For example, once the server has been fully built and turned over to the requester, RM 216 ensures that the requester (and/or any other authorized person) is granted access to the server.

The next box represents a cloud configuration management RM 218. RM 218 tracks and shares configuration and placement of all resources. In some embodiments, RM 218 is or includes the OMDB. RM 218 represents the configuration of the OMDB such that metadata regarding each of the VMs is stored and retrieved appropriately. The next box represents a system management integration RM 220, which in some embodiments, is or includes the OMDB. RM 220 provides two different types of communication, namely, data may be published and may be submitted. A requester can submit a demand for data as it is needed using various methods of access. RM 220 also represents a near real-time copy of the data that is stored in an off-line database so that any external system or user who needs access to the data may get it without impacting the performance of the "real-time" production copy of the data being used in the build process.

The next box represents a compute resource analysis RM 250. In some embodiments, RM 250 provides administrators an opportunity to perform preventive maintenance on the ETE system. For example, the administrator may run some tests designed to stress the infrastructure and the virtual machines to ensure no problems exist. RM 250 may detect patterns or conflicts, systems that should not be within the ETE system environment (e.g., because they consume too many resources).

The next box represents an application build and launch RM 252. RM 252 provides multiple ways to put an application on a server. Once the ETE system has built a platform, which generally includes the network, host name, working server with operating system and any un-configured database or middleware, applications may need to be installed for the server(s) to be ready for use by the business. In some embodiments, the RM 252 must pull down one or more applications from an external system. The ETE system is considered an "open" system, i.e., it functions in an open format such that it may access any type of external system.

Additionally, the ETE system periodically performs quality assurance checks throughout the build process. For example, if a requester requests a basic server with a common operating system for hosting a website, the ETE system builds the virtual server through the automated process without further manual input after the platform parameters have been input by the requester. The ETE system may build the server to a certain point, reboots the server, does some additional work, reboots the server again, and throughout performs periodic QA checks on the server to ensure appropriate parameters are met. If the build passes the QA check, then the process continues, and if the build does not pass the QA check, then the process remediates the problem.

Referring now to FIG. 3, a flowchart illustrates a method 300 for building a platform according to embodiments of the invention. The first step, as represented by block 302, is receiving a service request for a platform build, and the second step, as represented by block 304, is receiving platform parameters from the requester. In various embodiments, the service request may be received in different ways. For example, a user may access an intranet or Internet page including a form having multiple questions and/or fields for inputting information regarding the request for service or build request. In other embodiments, a user may prepare a document or message including parameters for a service request and the document may be manually or automatically received and processed in order to extract the parameters for the service request. For example, the document or message may be scanned and key words extracted so that the parameters for the service request may be known or determined. In some instances, after such an automated extraction, the user is asked to confirm the parameters in some way, such as by email, message, phone call or otherwise. In some embodiments, the requester is not a person or entity, but rather is a software module, resource manager or other automated requester. For example, in some embodiments, a software module is configured to recognize when a line of business requires one or more additional servers and to determine the parameters necessary for the additional servers to fill the needs of the line of business.

The next step, as represented by block 306, is to determine whether the service request requires any standalone physical machine and/or any virtual machines. In some instances, the requester may indicate a preference for one or the other. For example, in one instance, a requester may specify that they want a single physical machine in response to the service request. In other instances, where the requester does not specify or where the requester may specify that the ETE system should take the build the most efficient machine(s) possible, the system typically determines that one or more virtual machines or virtual servers will be appropriate end products of the build. The next step, as represented by block 308, is to initiate a build of one or more physical machines based on the received parameters in the case where it is determined that one or more physical machines is needed. Alternatively, or in combination with step 308, block 310 represents initiating a build of one or more virtual machines based on the received parameters in the case where it is determined that one or more virtual machines is needed.

The next step, as represented by block 312, is provisioning physical and virtual storage based on the received parameters. In some embodiments, the SBB system is used to provision storage. The SBB provides a framework for accepting and managing storage from any external vendor. The SBB is programmed to recognize the specific interface controls for each of the storage vendors and each storage component such that it provides a touch-free, logical provisioning of storage based on the parameters required for the build. For example, a particular platform may include storage provisioned at many different physical sites each utilizing different interface protocols on the cloud.

The next step, as represented by block 314, is provisioning physical and virtual processing power based on the received parameters. The ETE system may determine that a platform requires a specific amount of processing power based on the parameters received and may provision the processing power from one or more processors that match the characteristics required for the processing. For example, the processing speed and the types of calculations that will be required of the server may factor into the provisioning of the processing power. In some embodiments, the processing power is provisioned in a real-time or near-real-time way such that processing power is provisioned as it is needed, and once it is no longer needed for a specific task, it may be reclaimed and either used by one or more other virtual machines for processing or by the same virtual machine for processing a different task, rather than sitting idly and awaiting another processing task similar to the completed task. In this regard, processing resources may be utilized in an extremely efficient manner. This processing allocation or provisioning, reclamation and adjustment is described in concurrently filed patent application Ser. No. 13/678,414, entitled "Capacity Reclamation and Resource Adjustment", which is assigned to the assignee of this application and is incorporated by reference in its entirety herein.

The next step, as represented by block 316, is creating a shell and building and managing the virtual machines based on the received parameters. The build may involve many steps such as installation of operating systems and other software and configuration changes and/or powering adjustments such as reboots in order for the installations and configurations to function properly. Vision may be provided into the build process by communication with the hypervisors that are managing the virtual machines or from other sources such as the resource managers that are running the build process, as represented by block 318.

The next step, as represented by block 320, is managing power of resources. For example, the power of the various physical components that are being used in the build may be managed. If a virtual machine has an operating system installed on a physical component and that physical component must be restarted for the operating system to become appropriately functional, then the ETE system manages the physical component such that any other virtual machine's resources that are currently utilizing the physical component are either suspended temporarily or transferred to secondary or alternate physical components or resources during the power change. In some embodiments, power is managed on a micro level within a physical component. In other words, the portions of the physical component requiring power change or cycling in order to achieve a goal for one or more virtual machines are manipulated, while the remaining portions of the physical component retain power configurations otherwise running.

The next step, as represented by block 322, is tracking cloud usage associated with parameters for the virtual machines. As discussed above, metadata associated with the virtual machine(s) is stored regularly and can be retrieved as necessary in response to a user request and/or a request from a software module or resource manager. The next step, as represented by block 324, is integrating the platform with network services. This allows the virtual machine to appear to the network, internally and/or externally so that it may be queried, searched, used for processing or otherwise utilized in accordance with its design parameters.

The next step, as represented by block 326, is managing addition and participation of active directory for user authentication. This allows the authorized users to access and use the platform upon completion of the build and also allows for modification of those granted access and their access parameters.

The next step, as represented by block 328, is tracking and sharing configuration and placement of all resources. This step, in some embodiments, involves the OMDB. The OMDB provides for aggregation of vendor and institution data necessary for information technology infrastructure deployment, management, and federation. Utilizing cloud computing technology, the OMDB provides an aggregation of all data necessary for information technology infrastructures within an entity into one useable database that dramatically simplifies the ability to perform core functions and integrate external vendors and components with the entity's information technology infrastructure. In this way, the present invention modularly stores data required for an entity's information technology infrastructure and allows for easy deployment, intelligent monitoring, federation of data, and feedback associated with all aspects of the entity's information technology infrastructure.

Finally, the next step, as represented by block 330, is providing an offline database of near-real-time data for non-build access. In some embodiments, a copy or partial copy of the OMDB or other datastore and/or database used in conjunction with a build process is created and used for offline access of non-build access. This eliminates efficiency drops in the OMDB or other primary data source due to non-build related functions and therefore further increases the speed with which the build takes place.

Referring now to FIG. 4, a flowchart illustrates a method 400 for potential post-build processing. The first step, as represented by block 402, is performing periodic and/or regular checks for problems and analyzing the results of the checks. In instances where problems with the build are detected, the system may then pause the current build process or continue the current build process and perform a remediation concurrently, as represented by block 404.

The last step, as represented by block 406, is building and launching the platform. This build refers to building the desired software into the machines for functionality meeting or exceeding the expectations of the requester based on the requested build parameters. This may include calling external systems using an open format for installing one or more applications to make the machines business ready. Once the software build has been completed, the machines may be launched and used for their intended business purpose.

In various embodiments, a host naming application programming interface (HAPI) is used. The HAPI is a new IP service that provides a unique name for the platform on the network. The naming framework accounts for any unique naming schema associated with any of the various systems of the cloud such that no other name provided by the HAPI naming framework will be a duplicate. The name assigned a service request is used for asset tracking, application interaction and it is published as part of the platform's IP address and host name. The HAPI is described in concurrently filed patent application Ser. No. 13/678,424, entitled "Host Naming Application Programming Interface", which is assigned to the assignee of this application and is incorporated by reference in its entirety herein.

As illustrated in FIG. 5, the automation intelligence workload manager 120 of FIG. 1 may monitor the systems within the information technology infrastructure 500, which may also be referred to as or be part of the "cloud" as referred to herein, which functions over and using a network 502. In the illustration of FIG. 5, there are three different virtual local area networks (VLAN) 510 illustrated. Any number of VLAN may be present within the information technology infrastructure. As illustrated, VLAN1, VLAN2, and VLANx all include multiple hypervisors 512 within each of the VLANs. The hypervisors 512 are virtual managers of individual virtual machines within an information technology infrastructure. The hypervisors 512, for example, may provide the OMDB with an indication as to the use of the information technology data within each virtual machine. As illustrated in FIG. 5, one of the hypervisors 514 within VLANx is only using a limited amount of the information technology data deployed to the virtual machine associated with the hypervisor 514. Because the OMDB interacts with resource managers and/or an automation intelligence workload manager that is capable of monitoring each of the information technology components or infrastructures, including the network 502, VLANs 510, individual hypervisors 512, 514 associated with each virtual machine, the ETE system is capable of determining which virtual machines may be over capacity or under capacity with respect to the information technology data the virtual machine is utilizing. Also shown in the infrastructure 500 is the storage 506, such as the SBB, the storage controller 508 and a SAN fabric 504, which is the hardware that connects workstations and servers to the storage 506. The SAN fabric 504 enables any-server-to-any-storage device connectivity through the use of Fibre Channel switching technology.

FIG. 6 illustrates intelligent management of the provisioning of resources within the information technology infrastructure 600, in accordance with embodiments of the invention. The automation intelligence workload manager 602 may continually update workload, resources, and state, as illustrated in block 604, by being in constant communication with the virtual machines through the system's hypervisors 605, 606, 608, 610. As illustrated, the hypervisors are monitored to determine the amount of resources (e.g., storage and processing power) being used by each virtual machine and/or other system within the information technology infrastructure. The automation intelligence workload manager 602, in this embodiment, provides a monitoring display of all the hypervisors within an information technology infrastructure for the user to monitor. As discussed herein, software modules or resource managers may also request information regarding the status of current resources being utilized by each individual virtual machine.

As illustrated in FIG. 6, a monitoring display illustrates several different statuses within each hypervisor. A hypervisor that is utilizing approximately half of its designated resources is illustrated as hypervisor 605. A hypervisor that is utilizing all of its designated resources is illustrated as hypervisor 610. A hypervisor that is using none of its designated resources is illustrated as hypervisor 606. A hypervisor that is using one third of its designated resources is illustrated as hypervisor 608. In each of these cases the ETE system may be able to drill down within each hypervisor to determine specifically what resources are being utilized and what resources are available for reclamation and re-allocation. In this way, the ETE system may pinpoint specific resources, such as a particular program, memory, etc. that is not being utilized, and re-allocate it to a new purpose. Furthermore, the monitoring of the information technology infrastructure allows for monitoring of every information technology infrastructure component built, the information technology data used for the builds, the data on the cloud, the inventory available, capacity available, performance, billing, building sequences, etc. that may be necessary to build and/or operate an information technology infrastructure for an entity.

In some embodiments, the monitoring of individual hypervisors with the ability to drill down to the individual resources being utilized by the a virtual machine may further allow the ETE system to provide feedback with respect to the operational status of the virtual machine and/or resources associated with it. For example, the monitoring of a virtual machine may recognize an error or virus within data or resources within a single virtual machine. As such, the recognized error may be sent in the form of feedback to a user or other individual, such that the error may be monitored and/or remediated to ensure smooth operation of the rest of the information technology infrastructure.

Referring now to FIG. 7, a block diagram illustrates a cloud computing system environment 700 wherein an ETE system 701, a storage black box system 703, an OMDB system 704 and/or other components and/or systems of the invention and the various methods of the invention operate according to various embodiments.

A cloud 702 may allow for on-demand network access to a shared pool of configurable resources provided by the OMDB 704, user system 708, vendor systems (not shown), the ETE system 701, the SBB system 703 or otherwise. These resources may include but are not limited to hardware, software, networks, servers, storage, services, applications, systems, programs, packages, etc. and updates or programs to operate the same. The ETE system allows for these resources to be rapidly provisioned and released within the modular system. The network access may be a global area network (GAN), such as the Internet, a wide area network (WAN), a local area network (LAN), or any other type of network or combination of networks. The network may provide for wireline, wireless, or a combination wireline and wireless communication between devices on the network.

In some embodiments, resources and data may be stored on the cloud 702 and not at a local computing device, such that the memory of the local computing device is not affected by the work associated with the resources on the cloud 702. Furthermore, the cloud 702 may provide processing capabilities, such that the user may access processing power and/or other resources from the cloud 702 and not on his/her local computing device. In this way, a shared pool of resources may be accessed, processed, and stored by users of the cloud computing environment 700 all within the cloud 702. In some embodiments, the OMDB 704 may store data that may be accessible via the cloud 702. In this way, the data and associated resources may be stored on the cloud 702.

The cloud 702, in some embodiments, may take the form of several different service and/or deployment models as required by the managing entity of the cloud 702. The service models include, but are not limited to cloud software as a service, cloud application as a service, cloud platform as a service, and count infrastructure as a service. Cloud software as a service model provides the user with the ability to run programs and applications on the cloud infrastructure as opposed to the user system 708. Cloud application as a service is similar to cloud software as a service, but in this model the user is able to specify and save customer server configurations and application templates. Cloud platform as a service allows a user to be able to deploy onto the cloud user-created or acquired applications and programs. Cloud infrastructure as a service allows a user to control portions of the cloud's operating systems, deployment applications, storage, networking, and other fundamental computing resources of the cloud 702.

The deployment models may include, but are not limited to private model, public model, community model, and hybrid model. In some embodiments, the cloud 702 may be provided in a private model. The private model allows the cloud 702 to only be used only be a single entity. In some embodiments, the cloud 702 may be provided in a public model. The public model allows the cloud 702 to be available to the public or to multiple entities. In some embodiments, the cloud 702 may be provided in a community model. The community model allows the cloud to be accessed and/or used by a group of related entities. In some embodiments, the cloud 702 may be provided in a hybrid model. In the hybrid model the cloud 702 may be used both publicly and privately based on the provider's requests 702 may each be utilized for the cloud 702 associated with the ETE system 701. However, some models may require more monitoring than others. For example, in the public deployment model, a larger number of users may access the cloud 702 and therefore there is more likely going to be a security issue, simply based on the number of individuals who have access to the cloud 702 and the data or applications located on the cloud 702. In some embodiments, a private cloud 702 may provide the most security protection to an entity such as a financial institution and other users of the cloud 702.

In some embodiments, the user is an individual. The individual may be an associate and/or other employee within a financial institution. In other embodiments, the user may be a financial institution, government organization, corporation, or other entity with an information technology infrastructure. The user may wish to retrieve vendor provided data off of the cloud 702 for use on his/her user system 708. In some embodiments, the user may be provided with data from the cloud 702 via one or more of the other systems in the environment 700.

An end to end system (ETE) system 701 is a computer system, server, multiple computer systems and/or servers or the like and may include one or more of the other system and/or components shown in FIG. 7. The ETE system 701 may be part of the cloud 702 rather than merely connected to it. The facility management system 701, in the embodiments shown has a communication device 712 communicably coupled with a processing device 714, which is also communicably coupled with a memory device 716. The processing device is configured to control the communication device 712 such that the facility management system 701 communicates across the network 702 with one or more other systems. The processing device is also configured to access the memory device 716 in order to read the computer readable instructions 718, which in some embodiments includes a modular IT application 709. The memory device 716 also has a datastore 719 or database for storing pieces of data for access by the processing device 714.

The modular IT application 709 is configured for instructing the processing device 714 to perform various steps of the methods discussed herein, and/or other steps and/or similar steps. In various embodiments, the modular IT application 709 is included in the computer readable instructions stored in a memory device of one or more systems other than the ETE system 701. For example, in some embodiments, the modular IT application 709 is stored and configured for being accessed by a processing device of one or more other systems connected with the ETE system 701 through cloud 702.

An OMDB system 704 is configured for storing information as detailed herein. The OMDB system 704 is a computer system, server, multiple computer system, multiple servers, a mobile device or some other computing device configured for use by the ETE system 701 in conjunction with the methods discussed herein. The OMDB 704 may have a communication device 722 communicatively coupled with a processing device 724, which is also communicatively coupled with a memory device 726. The processing device 724 is configured to control the communication device 722 such that the OMDB system 704 communicates across the cloud 702 with one or more other systems. The processing device 724 is also configured to access the memory device 726 in order to read the computer readable instructions 728, which in some embodiments include an OMDB application 720. The memory device 726 also has a datastore 729 or database for storing pieces of data for access by the processing device 724 and other components, virtual machines and systems of the environment 700. The OMDB application 720 is configured to provide a secondary near-real-time copy of the data for non-build usage as discussed herein and/or other functions.

The storage black box (SBB) system 703 is configured for providing storage for one or more of the pieces of data used by the ETE system 701 when running the modular IT application 709 as discussed herein. In some embodiments, the SBB system 703 includes a communication device 742 communicatively coupled with a processing device 744, which is also communicatively coupled with a memory device 746. The processing device 734 is configured to control the communication device 742 such that the SBB system 703 communicates across the cloud 702 with one or more other systems. The processing device 744 is also configured to access the memory device 746 in order to read the computer readable instructions 748, which in some embodiments include instructions for communicating with the ETE system 701, and in some embodiments, includes some or all of the modular IT application 709.

The user system 708 is configured for providing access to the ETE system 701 and/or the other components, virtual machines and/or systems of the environment 700 when running the modular IT application 709 as discussed herein. In some embodiments, the user system 708 includes a communication device 732 communicatively coupled with a processing device 734, which is also communicatively coupled with a memory device 736. The processing device 734 is configured to control the communication device 732 such that the user system 708 communicates across the cloud 702 with one or more other systems. The processing device 734 is also configured to access the memory device 736 in order to read the computer readable instructions 738, which in some embodiments include instructions for communicating with the ETE system 701, and in some embodiments, includes some or all of the modular IT application 709. In some embodiments, the user system also includes a datastore 739.

In various embodiments, one of the systems discussed above, such as the ETE system 701, is more than one system and the various components of the system are not collocated, and in various embodiments, there are multiple components performing the functions indicated herein as a single device. For example, in one embodiment, multiple processing devices perform the functions of the processing device 714 of the ETE system 701 described herein. In various embodiments, the ETE system 701 includes one or more of the OMDB system 704, the SBB system 703, and/or any other system or component used in conjunction with or to perform any of the method steps discussed herein.

Referring now to FIG. 8, the modular IT application 709, which may be stored in the cloud 702 in one or more memory devices, for example memory device 716, as computer readable instructions, for example computer readable instructions 718, may include computer readable instructions forming a capacity reclamation and resource adjustment (CRRA) application 810 and/or a host naming application programming interface (HAPI) application 820. In various embodiments, the CRRA application 810 and/or the HAPI application 820 are embedded in the end to end system 701 and used during a build of a platform and/or during multiple platform builds for improving efficiency and subsequent accuracy of network communication, respectively. The CRRA application 810 and/or the HAPI application 820 may be completely stored and executed on one device or portions of one or both may be stored and/or executed on multiple devices and/or over the cloud 702.

According to embodiments of the invention, a storage black box system, such as system 703 of FIG. 7, or some other system or systems running an application such as SBB application 740, provides a centralized storage management solution that can leverage existing vendor storage to hide the complexities of the storage allocation and usage from the requester, whether a software module or an entity. The SBB enables policy-based storage management across multiple capacity resources, including vendor physical and virtual storage solutions. The SBB provides a policy-based rule set that analyzes a request for storage in light of the available storage components and determines what allocation details can best meet the requirements of the requested storage. Once the determination is made, the SBB provisions the storage by reserving the storage from the vendor(s) and establishes the communication channel across appropriate array, network and operating system ports so that the allocated storage is seen by the operating system of the associated virtual machine, for example, as a single supply of storage available for usage.

Referring now to FIG. 9, an illustration of a storage automation framework 900 including the storage black box 910 is shown according to embodiments of the invention. The storage automation framework 900 includes three primary components: a portal and application programming interface (API) access and control framework component 902 ("portal"), an automation engine 904 and component tools and interfaces 906 ("component interfaces").

The component interfaces 906 box represents one or more interfaces for interacting with a vendor's storage solution(s) and/or other external services or systems. The SBB functions in some regards as a repository for the knowledge of how to communicate with external systems, such as the vendor systems. There may be many types of resources including many types of storage resources and network types. Additionally, every vendor may have different solutions for primary, secondary and backup storage needs. For example, backup storage solutions may include tape or disk based solutions sets. The SBB, once it is programmed to interface with a vendor's storage solution, may automatically receive a request and provision resources using all the available resources at its disposal.

The component interfaces 906, in various embodiments, may include several pieces. For example, component interfaces 906 may include a vendor two API 912. API 912 may interface with a well-known network attached storage (NAS), which is file-level computer data storage connected to a computer network providing data access to clients, or IP-sharing type of storage technology. In some instances, vendors may also provide storage area networks (SANs), which are dedicated networks that provide access to consolidated, block level data storage, iSCSI, which is an abbreviation of Internet Small Computer System Interface, IP-based storage networking standard for linking data storage facilities, and/or other platforms or storage solutions. In some solutions, a vendor uses a Network File System (NFS) protocol, which is a distributed file system protocol allowing a user on a client computer to access files over a network in a manner similar to how local storage is accessed. Some vendors have preexisting interfaces or resource managers, as represented by NAS resource manager 914. The SBB may utilize some of the interface functionality of the preexisting interface in order to access the vendor solution. However, despite a vendor having a pre-existing interface, the SBB, in most embodiments, must still be programmed to interact with some or all the components of the interface in order to apply the policy-based provisioning functionality to achieve efficient and accurate storage provisioning in a multiple vendor type scenario. As another example, the SBB may interact with a vendor three API 916 and the SBB interacts with the FC resource manager 917. Additionally, some vendors have not developed a preexisting interface or resource manager such as resource manager 914. In some embodiments, the SBB must be configured to interact with the storage solution(s) of a vendor without the benefit of drawing from a preexisting interface or resource manager.

The SBB 910 in conjunction with the storage automation framework 900 provides a package response to a request for storage. For example, if a requester requires a storage solution having certain parameters such as time to access storage, duration of data storage, how fast can storage be accessed in various situations, how fast does the storage medium operate, how quickly can additional storage be provided, what are the input/output rates and the like, the SBB provides that storage solution similar to a customer shopping at a store being able to search for characteristics of a product and purchase a product based on its advertised characteristics. The requester of the SBB achieves the storage solution because of its real-time capacity planning and mapping of component and network channel(s)/ports at a micro-scale and optimization of those parameters to meet the storage request.

With this discussion in mind, the embodiment of the SBB 910 of the automation engine 904 shown in FIG. 9 includes a block automation interface 918 and a NAS automation interface 920, each configured to interact with one or more vendor solutions through their respective APIs in order to properly map and provision a storage solution individualized for a specific request. In various other embodiments, additional, fewer and/or different automation interfaces may be programmed into the SBB for interacting with different vendors' solutions and/or different types of storage solutions. The block automation interface 918 communicates with the SBB block or fibre channel disk.

In some embodiments, the SBB 910 includes a storage resource manager 922, which may communicate with a vendor's API, such as a vendor's virtual machine resource manager 924 through, for example, a resource manager API 926. Using the vendor's virtual machine resource manager 924, a user can manually perform various tasks, such as publish more storage to host pieces, begins to use the storage through the virtual machine resource manager 924 and the like. The SBB 910's storage resource manager 922 is programmed to talk to the vendor's virtual machine resource manager 924 in order to recognize new available storage, add new storage to an allocation for one or more virtual machines, establish a connection between the storage solution and the operating system such as storage is allocated as needed, and the storage resource manager 922 may also be able to determine the best location for reserving the storage based on the parameters required for the storage by accessing characteristics of the storage solution from the vendor's virtual machine resource manager 924.

In order to make this determination, the storage resource manager 922 uses the policy engine 928, which includes a set of policy-based management rules that determines the best vendor, type, size and other parameters of the storage to reserve and allocate for the request. The policy engine 928 runs the parameters submitted by the requester through the set of policy rules, that have vision into the available resources and their functional characteristics in order to determine the proper storage solution(s). The policy engine 928 takes into account not only the physical components available but also the logical components of the real and virtual storage components available. In some embodiments, the set of rules includes rules specific to a type of virtual machine being built or otherwise limiting and/or dictating the types, sizes, etc. of the storage solution(s) being chosen. In various embodiments, the policy engine 928 uses weighted policy rules. For example, various characteristics of a build may be considered to have a different priority than others. As a specific example, a number of virtual machines included in a single array may be restricted such that if the number of VMs on a single array reaches or surpasses the threshold, then no further resources of the array may be allocated elsewhere. Similarly, the latency or time to access a resource may be weighted such that, if the latency of the physical representation of the NAV device (see FIG. 12) rises to a threshold, then no further resources may be allocated from the physical representation of the NAV device. Another characteristic that may be taken into consideration by the policy rules is the NFS input/output per second. Accordingly, in some embodiments, various characteristics of the build and/or characteristics of the resources potentially available for use in the build, are weighted and applied to the build process. In some of the same embodiments and/or other embodiments, one or more thresholds are established that dictate the use of resources during build initiatives.

Further, in some embodiments, the policy engine set of rules may include a risk component that manages risk. In many applications, storage may be over-allocated, that is, more storage may be allocated than actual real disk space available. This is called thin provisioning or over-provisioning. The risk component of the policy engine manages this risk by receiving parameter(s) from the requester mandating the risk tolerance for the requested storage solution. In some embodiments, where the requester does not mandate the risk tolerance, one is assigned based on a predetermined set of rules for determining a risk tolerance. For example, in one embodiment, the risk tolerance is determined based on the importance of the functionality of the virtual machine for which the storage is being requested and/or the purpose of the storage being allocated to the virtual machine. Thus, if the storage is being used as the operating system for a virtual machine providing key functionality to an institution, then the risk tolerance may be determined to be very low, whereas if the storage is being used to install an easily accessible executable application that is not expected to be accessed regularly, then the risk tolerance may be very high for over-allocation. Accordingly, a table of predetermined risk tolerances may be created and stored by the SBB 910 and/or policy engine 928 so that, in instances where risk tolerance is not provided by the requester, the risk tolerance may be determined. In other instances, where a table of risk tolerances does not exist or where the request cannot be reconciled with a table of preexisting risk tolerances, the SBB 910 may analyze the request to determine the risk tolerance. In some embodiments, this may be done by analyzing the importance of the virtual machine to which the storage is to be allocated and/or the intended use for the storage to be allocated. For example, if a critical function such as installation of firmware is intended for the storage, then the SBB 910 may determine the risk tolerance is low. Conversely, if the virtual machine for which the storage is being allocated is a duplicate of other virtual machines that may take up the functions of the virtual machine if it fails, and thus provide a backup, then the SBB 910 may determine the risk tolerance for the storage to be allocated to the virtual machine is high. In this event, the storage may be more greatly over-allocated than were the risk tolerance determined to be low, in which case the storage may be only slightly over-allocated or not over-allocated at all.

The SBB 910 has several other modules or components in various embodiments. The product catalog 930 provides a listing of the possible storage solutions or examples of the possible storage solutions available through the SBB 910. For example, the types of disks available, the types of backups available, the speeds of the available disks, the protocols being used to access the available disks, as well as different virtualization protocols/concepts being available for use. The monitoring component 934 integrates with the product catalog such that the product catalog reflects an accurate representation of the available resources at a given time. The monitoring component 934, in some embodiments, may also be configured to monitor proper functionality of the storage solutions as well as communication channels established between operating system(s) and storage solution(s). The metrics and reporting component 932 provides reports detailing the allocations of the storage solutions such as to what virtual machines they are allocated, how many resources are allocated, physical and virtual, measured characteristics of the performance of the storage solutions and the like. The SBB 910 also includes logical provisioning 936, data management 938 and configuration standards 940 that are discussed elsewhere herein. For example, the logical provisioning component 936 provisions the storage solution to the virtual machine(s) once the policy engine 928 has determined the proper location and channel for the storage, the data management component 938 ensures data is properly read, written, modified and deleted from the storage solutions, and the configuration standards 940 houses some or all the configurations required for communicating both with the various vendor APIs and storage components as well as with the various network configurations and the operating systems of the virtual machines.

The application storage template 942 is a template tool that allows requesters or users flexibility to dictate certain characteristics of their storage solutions, such as specifying that a certain number of shares or physical allocations be included in the provided storage solution. The application storage template 942 allows the requester or user to preconfigure the storage solution using specific parameters necessary for their build. The template 942 interacts with one or more of the other components or modules of the SBB and/or the vendor solution(s) in order to determine capacity plans, and other characteristics for reserving proper storage. Then, an agent may be used to engage the operating system of a virtual machine to automatically create and mount the storage configured by the application storage template 942. In some embodiments, one or more of the other components shown in the SBB 910 of FIG. 9 are part of the storage resource manager 922. For example, the storage resource manager may be or be part of the application storage template 942. Additionally, the SBB 910 may interact with a vendor's web services component 946, which may include a solutions enabler 948. The requester or user may generally interact with these components directly to create certain storage solutions, however, the SBB includes interfacing capabilities for interacting automatically with the web services component 946.

In the portal 902, the SBB 910 interacts with a requester, user and/or administrator. A web services client 944 provides an interface for interaction. In some embodiments, outputs from one or more of the components or modules of the SBB 910 may be presented to the user for viewing, printing, communicating or otherwise using. For example, the metrics and reporting component 932 may present reports to an administrator of the SBB 910. The web services client 944 may also include an API such that a requesting software module or entity may call the SBB and request a storage allocation and input the parameters of the request.

Thus, the SBB 910 may be considered a "plug-n-play" docking station for storage having a built in configuration set for various vendor storage solutions, thereby allowing a requester to achieve effective and fast storage allocations through touchless, logical provisioning. The SBB may accept and manage storage from any vendor, and as part of the framework, provided specific configuration of interface controls. Thus, when the requester calls for a storage solution, the SBB 910 builds the solution and includes a customer storage allocation that might include one type of storage or many types of storage.

Referring now to FIG. 10, a combined flowchart and block diagram illustrates a representation of an example storage allocation 1000 according to embodiments of the invention. The bottom layer is a physical disk or array layer 1010. This is the layer representing the physical storage components provided by the vendor(s) or otherwise. The next layer is the logical components layer 1020. This layer may include virtual space, achieved through, for example, over-allocation. The next layer is the real potential space available for mapping (or allocation) layer 1030. Thus, when the SBB 910 allocates storage, this is the available "pool" of storage resources available for mapping to storage solutions for requests. The next layer is the network ports layer 1040. In order to establish a channel from the physical disk 1010 to the virtual machine, the SBB 910 must configure the proper network ports 1040 as well as the proper operating system ports 1050. Once the storage solution has been configured and provisioned (allocated), the operating system of the virtual machine may see the available storage as one piece (or multiple pieces if desired), as represented by block 1060.

Referring now to FIG. 11, a diagram illustrates a representation of a detailed example storage allocation 1100 using block layers of storage according to embodiments of the invention. The bottom layers are physical component layers. The system bay layer 1105 and the disk bay layer 1110 house the parts of the physical disks, as represented by layer 1115. The physical disks are represented by the thin pool 1120, which represents all the actual physical memory available for allocation by the SBB 910. The next layer is the logical component layer 1125, which can be manipulated to be any size as desired. The logical component layer 1125 includes both real and virtual storage space. The logical components may be represented by the META-LUN or meta-Logical Unit Number (LUN) layer 1130. The meta-LUN is a construct that represents multiple logical components based on how much space the SBB 910 needs to present to the end server or the end operating system. The meta-LUN represents a real potential space. When the storage is provisioned, the server and/or operating system is provided with access to this layer, which is the real potential space layer of the storage. One or many meta-LUNs may be accessible by a single server or operating system.

In some embodiments, a single meta-LUN 1130 may be presented to a server across multiple channels or ports, as represented by layer 1135. In layer 1135, the SBB 910 may determine for performance reasons, to allow access to the meta-LUN 1130 through four network ports: A, B, C and D. For example, the storage solution may require certain performance capacity parameters that fibre channel port A may not support but port B does support and so on. The policy engine 928 is cognizant of the requirements of the request and can configure the ports in order to take advantage of specific performance characteristics of different ports. In one embodiment, for example, for performance reasons such as redundancy the policy engine 928 may use "zoning" over the fibre channel SAN, which is represented by layer 1140. Zoning refers to the process, similar to the way a V-LAN is setup in networking, where the meta-LUN is constructively split into zones that are each associated with one or more ports. The SBB 910 may configure the zones so that the server can communicate with the storage piece similar to a routing tool creating a channel. This may be done in some embodiments, by configuring the zones such that, in that zone, the server's worldwide name can talk to the array worldwide name that represents the desired port or ports.

Thus, the SBB 910 has configured the array components and the fibre channel ports and SAN. The operating system has also been configured to boot up with fibre channel host bus adapters (HBAs) and send out a query, as represented by the OS multi-pathing layer 1165, the OS HBA driver view layer 1160, which controls the OS ports, and the emulated HBA layer 1155. Layers 1145 and 1150 represent network switches. The multi-pathing layer 1165 combines the multiple views of the meta-LUN (communicated over different ports, switches and/or channels) so that the OS sees the multiple view as one single pieces of storage. Thus, the OS can then, once the handshaking and confirmations are complete, perform typical functions on the storage space, such as formatting, putting in logical volume groups, applications may be installed on the space, etc. In summary, the setup of the channels used for the example, were performed by the policy-based rules so that many, many different implementations for various requests may be provisioned.

In various other embodiments, such as those involving a vendor network of virtual machines, the same representative steps must be taken, although they are performed in slightly different ways. As shown in the FIG. 12, a diagram illustrates a representation of another detailed example storage allocation 1200 using NAS layers of capacity according to embodiments of the invention.

Referring now to FIG. 13, a flowchart illustrates a method 1300 for provisioning storage in response to a storage call according to embodiments of the invention. The first step, as represented by block 1302, is determining specific interface controls and/or configurations for one or more vendor storage components and one or more network configurations. For example, in FIG. 11 discussed above, a block storage configuration example allocation was illustrated and in FIG. 12, a NAS storage configuration example allocation was illustrated. Step 1302 represented programming the SBB 910 to account for the intricacies of variations in the storage configurations and those interfaces and solutions provided by various vendors.

The next step, as represented by block 1304, is to receive a call for storage include the required storage parameters. This call may come from, for example, a software module or application or from an individual user or entity. The next step, as represented by block 1306, is to run the policy engine to determine the appropriate storage components and the array and network configurations necessary for achieving the required parameters. The next step, as represented by block 1308, is to provision the component space and establish the channel from the operating system to the reserved components for storage usage. Finally, the next step is to present the single storage space to the operating system for usage, as represented by block 1310.

In summary, embodiments of the invention are directed to a system, method, or computer program product for providing a storage allocation to a virtual machine in response to a service request including receiving a service request including a virtual machine and storage parameters and running a policy engine to determine appropriate storage allocation to achieve storage parameters received from the requester, which may include applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space. Component space is provisioned and a communication channel is established between the operating system to the component space based on the policy engine.

The invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a storage allocation to a virtual machine in response to a service request, the system comprising:
   a memory device with computer-readable program code stored thereon;
   a communication device;
   a processing device operatively coupled to the memory device and the communication device, wherein the processing device is configured to execute the computer-readable program code to:
      receive a service request for a platform build from a requester, the platform build comprising a virtual machine;
      receive a plurality of storage parameters from the requester;
      run a policy engine to determine appropriate storage allocation to achieve storage parameters received from the requester; and
      provision component space and establishing a communication channel from an operating system of the virtual machine to the provisioned component space.

2. The system of claim 1, wherein the processing device is further configured to execute the computer-readable program code to:
presenta single storage space to the operating system of the virtual machine for usage.

3. The system of claim 1, wherein running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

4. The system of claim 1, wherein running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

5. The system of claim 1, wherein the processing device is further configured to execute the computer-readable program code to:
communicate with one or more vendor application programming interfaces to interface with a plurality of vendor storage components according to a preprogrammed set of configuration standards associated with a vendor and the vendor storage components.

6. The system of claim 1, wherein the processing device is further configured to execute the computer-readable program code to:
run a web services client for providing an application programming interface for receiving service requests and storage parameters from requesters.

7. The system of claim 1, the processing device is further configured to execute the computer-readable program code to:
provide a product catalog for presenting a list of available storage solutions to a potential requester;
regularly monitor functionality of communication across one or more communication channels established by the system between an operating system and storage components to check for errors; and
in response to a request, present a report comprising information related to the functionality of the communication channels.

8. A computer program product for providing a storage allocation to a virtual machine in response to a service request, the computer program product comprising at least one non-transitory computer-readable medium having computer-readable program code portions embodied therein, the computer-readable program code portions comprising:
an executable portion configured for receiving a service request for a platform build from a requester, the platform build comprising a virtual machine;
an executable portion configured for receiving a plurality of storage parameters from the requester;
an executable portion configured for running a policy engine to determine appropriate storage allocation to achieve storage parameters received from the requester; and
an executable portion configured for provisioning component space and establishing a communication channel from an operating system of the virtual machine to the provisioned component space.

9. The computer program product of claim 8, wherein the computer-readable program code portions comprising:
an executable portion configured for presenting a single storage space to the operating system of the virtual machine for usage.

10. The computer program product of claim 8, wherein running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

11. The computer program product of claim 8, wherein running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

12. The computer program product of claim 8, wherein the computer-readable program code portions comprising:
an executable portion configured for communicating with one or more vendor application programming interfaces to interface with a plurality of vendor storage components according to a preprogrammed set of configuration standards associated with a vendor and the vendor storage components.

13. The computer program product of claim 8, wherein the computer-readable program code portions comprising:
an executable portion configured for running a web services client for providing an application programming interface for receiving service requests and storage parameters from requesters.

14. The computer program product of claim 8, wherein the computer-readable program code portions comprising:
an executable portion configured for providing a product catalog for presenting a list of available storage solutions to a potential requester;
regularly monitoring functionality of communication across one or more communication channels established by the system between an operating system and storage components to check for errors; and
in response to a request, presenting a report comprising information related to the functionality of the communication channels.

15. A computer-implemented method for providing a storage allocation to a virtual machine in response to a service request, the method embodied in at least one non-transitory computer-readable medium having computer-readable program code embodied therein, the computer-readable program code to cause a computer processor to:
receive a service request for a platform build from a requester, the platform build comprising a virtual machine;
receive a plurality of storage parameters from the requester;
run a policy engine to determine appropriate storage allocation to achieve storage parameters received from the requester; and provision component space and establishing a communication channel from an operating system of the virtual machine to the provisioned component space.

16. The method of claim 15, wherein the computer-readable program code is further to cause a computer processor to:
present a single storage space to the operating system of the virtual machine for usage.

17. The method of claim 15, wherein running the policy engine comprises applying a set of policy-based rules to the received storage parameters to determine one or more appropriate logical components of storage to map, to determine one or more array ports to enable, and to determine one or more network ports to enable in order to establish one or more communication channels between the operating system of the virtual machine and the provisioned component space.

18. The method of claim 15, wherein running the policy engine comprises applying a set of policy based rules comprising a risk tolerance determination, whereby a risk tolerance associated with the service request is determined based on one of a table of predetermined risk tolerances associated with one or more storage parameters or one or more virtual machine parameters or based on an analysis of the importance of the virtual machine to which the storage is allocated or the importance of the intended function of the storage to be allocated to the virtual machine.

19. The method of claim 15, wherein the computer-readable program code is further to cause a computer processor to:
communicate with one or more vendor application programming interfaces to interface with a plurality of vendor storage components according to a preprogrammed set of configuration standards associated with a vendor and the vendor storage components.

20. The method of claim 15, wherein the computer-readable program code is further to cause a computer processor to:
run a web services client for providing an application programming interface for receiving service requests and storage parameters from requesters.

21. The method of claim 15, wherein the computer-readable program code is further to cause a computer processor to:
provide a product catalog for presenting a list of available storage solutions to a potential requester;
regularly monitor functionality of communication across one or more communication channels established by the system between an operating system and storage components to check for errors; and
in response to a request, present a report comprising information related to the functionality of the communication channels.

* * * * *